Aug. 23, 1960
R. SCHNEIDER
2,950,130
FLUID PRESSURE RESPONSIVE PIPE COUPLING
HAVING IDENTICAL HALVES
Filed Sept. 5, 1957
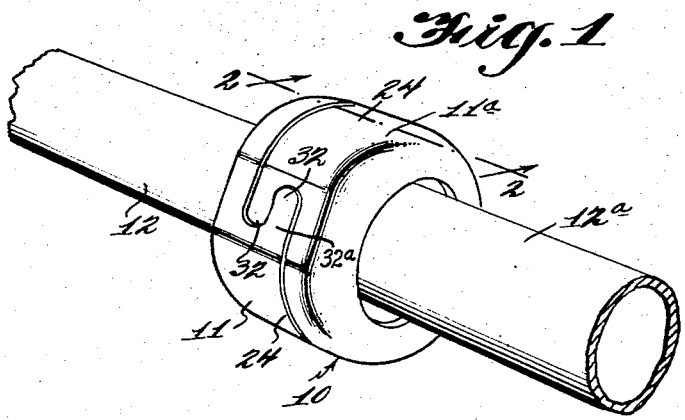
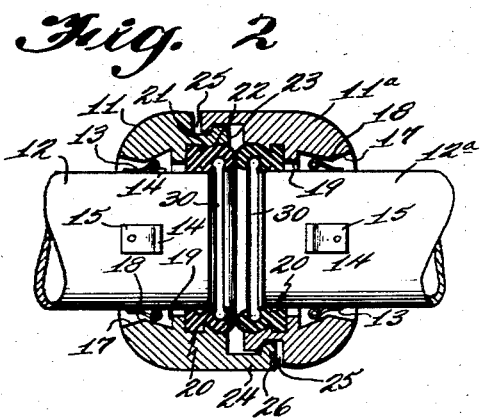
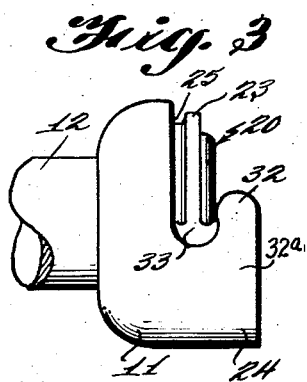
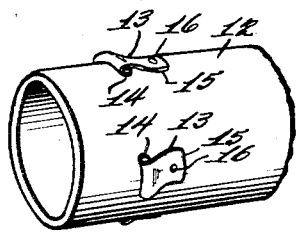
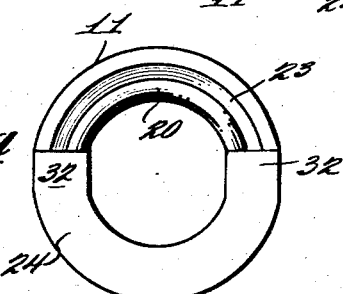
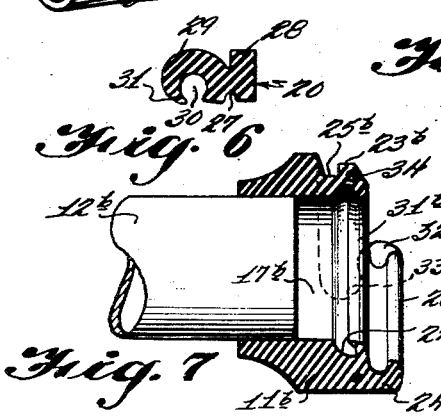
INVENTOR
RICHARD SCHNEIDER
BY Kimmel & Crowell
ATTORNEYS United States Patent Office 2,950,130
Patented Aug. 23, 1960

2,950,130
FLUID PRESSURE RESPONSIVE PIPE COUPLING HAVING IDENTICAL HALVES

Richard Schneider, P.O. Box 4590, Sao Paulo, Brazil

Filed Sept. 5, 1957, Ser. No. 682,203

1 Claim. (Cl. 285—67)

The present invention relates to pipe couplings, and more particularly to pipe couplings of the quick detachable type.

The primary object of the invention is to provide a pipe coupling of the quick detachable type formed from a pair of identical coupling members.

Another object of the invention is to provide a quick detachable coupling having a single seal for sealing the couplings to each other and each coupling to its respective pipe.

A further object of the invention is to provide a quick detachable coupling of the class described above having resilient means for detachably engaging the coupling to the pipe.

A still further object of the invention is to provide a seal for a quick detachable coupling constructed so that water pressure engaging thereagainst will increase the sealing pressure to assist in maintaining the coupling leaf proof.

Another object of the invention is to provide a quick detachable coupling of the class described above which is inexpensive to manufacture, easy to use, and which is leak proof under normal pressures.

Other objects and advantages will become apparent in the following specification when considered in the light of the attached drawings, in which:

Figure 1 is a perspective view of the invention, shown coupling a pair of pipe ends.

Figure 2 is a longitudinal cross-section taken along the line 2—2 of Figure 1, looking in the direction of the arrows.

Figure 3 is a side elevation of one of the coupling members.

Figure 4 is an end elevation of one of the coupling members.

Figure 5 is a fragmentary perspective view of the pipe to be coupled, illustrating the resilient coupling retainers.

Figure 6 is an enlarged cross-section similar to Figure 2, illustrating the seal removed from the coupling.

Figure 7 is a longitudinal cross-section of a modified form of the invention.

Referring now to the drawings in detail wherein like reference characters indicate like parts throughout the several figures, the reference numeral 10 indicates generally a quick detachable pipe coupling formed from identical halves 11 and 11a.

Since the coupling halves 11, 11a are identical, the half 11 will be described in detail as to its structure and in the use and operation to follow the interrelation of the halves 11, 11a will be set forth.

The coupling halves 11, 11a are telescopically engaged over the pipe ends 12, 12a which are provided with a plurality of spring retainers 13. The spring retainers 13 have a coiled end portion 14 and a longitudinally extending portion 15. The longitudinally extending portion 15 is secured to the pipe 12 by means of spot welding or rivets, as indicated at 16.

The coupling half 11 is provided with a bore 17 which is restricted at 18 to provide a detent for engagement with the spring retainers 13, as shown in Figure 2.

The bore 17 has a radially inwardly extending flange 19 forming an inner seat for a seal 20. The bore 17 is provided with an inwardly tapered inwardly extending annular flange 21 arranged in spaced relation to the flange 19. The bore 17 terminates in an arcuate portion 22 immediately adjacent the flange 21.

An external flange 23 extends halfway about the coupling half 11 in immediate surrounding relation to the arcuate terminal portion 22 of the bore 17. Oppositely of the flange 23 the coupling half 11 is provided with a portion 24 extending longitudinally therefrom along the half of the coupling half 11 opposite the flange 23.

The flange 23, with the remaining portion of the coupling half 11, provides a groove 25 which is coextensive with the flange 23. The longitudinally extending portion 24 is provided with a radially inwardly extending flange 26.

The seal 20 has an annular groove 27 arranged for sealing engagement against the outer surface of the pipe 12. Oppositely of the annular groove 27 is a radially outwardly extending flange 28 which engages between the flanges 19 and 21 within the bore 17. The seal 20 has an arcuate portion 29 which engages in the arcuate terminal end portion of the bore 17 and extends slightly beyond the terminal end of the bore 17.

The arcuate portion 29 of the seal 20 has a semi-cylindrical annular groove 30 formed in the inner surface thereof to render the seal 20 sufficiently flexible so that the feather edge 31 formed thereby can be deformed by water pressure into a tighter sealing engagement with the seal 20 in the adjacent coupling half 11a.

The portions 24 on the coupling halves 11, 11a are provided with transversely extending arcuate neck 32a terminating in bulbous members 32 arranged at the outer end of the portions 24, the arcuate neck portions and the bulbous members delineating sockets 33 on opposite sides of the coupling half 11 to receive the bulbous portions 32 of the opposite coupling half 11a, with the bulbous portions overlapping in a transverse direction.

In the use and operation of the invention, the coupling halves 11, 11a are snapped over the resilient retainers 13 with the annular grooves 27 in contact with the outer surface of the pipes 12, 12a adjacent the ends thereof to be coupled.

The couplings 11, 11a are brought into contact with each other with their axes offset laterally with the bulbous portions 32 of each of the coupling halves 11, 11a arranged in close proximity to the sockets 33 of the opposite coupling half 11, 11a.

The seals 20 are in contacting relation and by compressing the seals slightly and sliding the coupling halves 11, 11a into axially aligned relation, the bulbous portions 32 of each are moved into the sockets 33 of each, and the flanges 26 of each are engaged in the grooves 25 of each so that the flanges 23 and 26 lock together to secure the coupling half 11 to the coupling half 11a with a portion of the seals 20 being in contacting relation, as viewed in Figure 2.

Referring now to Figure 7 wherein a modified form of the invention is illustrated, a pipe coupling half 11b is formed of resilient material and engages over the end of a pipe 12b with the pipe 12b extending into a bore 17b in the coupling half 11b.

The bore 17b at its terminal end oppositely of the pipe 12b is outwardly flared at 22b and carries at its outer end a tapered radially inwardly extending annular flange 31b. The coupling half 11b outwardly of the flange 31b has a reinforcing ring 34 molded therein to maintain the shape and size of the coupling half 11b.

A flange 23b extends radially outwardly of the coupling half 11b for half of the circumference thereof delineating a groove 25b coextensive with the flange 23b. A portion 24b extends longitudinally from the coupling half 11b for half the circumference thereof oppositely of the flange 23b.

The portion 24b has a radially inwardly extending flange 26b. The portion 24b is provided with a pair of oppositely disposed bulbous transversely extending portions 32b delineating sockets 33b, similar to the sockets 33 in the preferred form of the invention.

The use and operation of the modification illustrated in Figure 7 is identical with that of the preferred form of the invention with the exception that the flange 31b cooperating with the flange 31b of the coupling half 11b coupled therewith replaces the seals 20 and the feathered terminal portions 31 thereon.

The bulbous portions 32b engage in the sockets 33b and the flange 26b engages in the groove 25b and with the flange 23b of the coupling connected thereto in exactly the same manner as the coupling halves 11, 11a are coupled together.

Having thus described the preferred embodiments of the invention, it should be understood that numerous structural modifications and adaptations may be resorted to without departing from the scope of the appended claim.

What is claimed is:

A quick coupling structure for connecting fluid carrying pipe sections comprising a pair of identical coupling halves each of which comprises a generally cylindrical body portion having a bore extending therethrough, a radially inwardly extending flange integrally formed with said body intermediate the opposite ends of said bore, a second radially inwardly extending flange arranged parallel to and spaced from said first flange, a longitudinally extending portion formed on half of each of said body portions, a bulbous member integrally formed on each side of said longitudinally extending portion projecting transversely therefrom and spaced axially from said body portion, and having a reduced arcuate neck portion connecting said bulbous member to said longitudinally extending portion to form a bulbous socket adjacent each bulbous member, said bulbous members on said coupling halves being engageable in the bulbous sockets of the companion coupling halves with the bulbous portions overlapping a median line through their centers for detachably securing said halves together when engaged by sliding movement perpendicularly to the axis of said coupling halves, the interengagement of said bulbous members in said bulbous sockets restraining said coupling halves against detachment from each other in a longitudinal direction, a pair of identical compressible resilient seals each of which has a radially outwardly extending flange engaged between said radially inwardly extending flanges in one of said bores, each of said seals having a semi-circular annular groove formed in the inner surface thereof, each of said seals extending beyond the terminal end of the respective body portion and terminating adjacent the juncture of said body portion with said longitudinally extending portion for abutting relation with each other, each of said seals having an inner portion opposite the abutting end which is adapted to engage a smooth end portion of one of said fluid carrying pipe sections and seal therewith, said seals being compressed into tight engagement with one another by fluid pressure and separately biasing said identical halves away from each other and urging said bulbous members into interengagement with said sockets so that the overlapping relation of the adjacent bulbous portions resists detachment of said coupling halves in a transverse direction.

References Cited in the file of this patent

UNITED STATES PATENTS

| | | |
|---|---|---|
| 296,093 | Wells | Apr. 1, 1884 |
| 653,143 | Martin | July 3, 1900 |
| 714,311 | Lee | Nov. 25, 1902 |
| 1,014,108 | Wild | Jan. 9, 1912 |
| 1,022,927 | Bradley | Apr. 9, 1912 |
| 1,300,414 | Klell | Apr. 15, 1919 |
| 1,839,682 | Lamb | Jan. 5, 1932 |
| 1,988,694 | Mallay | Jan. 22, 1935 |
| 2,257,321 | Arnold | Sept. 30, 1941 |
| 2,774,617 | Lanninger | Dec. 18, 1956 |
| 2,784,990 | Pollia | Mar. 12, 1957 |

FOREIGN PATENTS

| | | |
|---|---|---|
| 2,765 | Great Britain | Nov. 2, 1911 |
| 278,677 | Great Britain | Dec. 17, 1928 |